United States Patent

[11] 3,598,997

[72] Inventor Richard D. Baertsch
Scotia, N.Y.
[21] Appl. No. 742,654
[22] Filed July 5, 1968
[45] Patented Aug. 10, 1971
[73] Assignee General Electric Company

[54] SCHOTTKY BARRIER ATOMIC PARTICLE AND X-RAY DETECTOR
3 Claims, 1 Drawing Fig.

[52] U.S. Cl. .......... 250/83, 250/83.3, 317/235
[51] Int. Cl. .......... G01t 1/24, H01l 15/00
[50] Field of Search .......... 250/83.3, 83; 317/235

[56] References Cited
UNITED STATES PATENTS

| | | | |
|---|---|---|---|
| 3,049,622 | 7/1962 | Ahlstrom et al. | 317/235 (31) |
| 3,311,759 | 3/1967 | Rouse et al. | 250/83.3 |
| 3,430,043 | 2/1969 | Blumenfeld et al. | 250/83.3 |
| 3,457,409 | 7/1969 | Shenker et al. | 317/235/27 |

*Primary Examiner*—James W. Lawrence
*Assistant Examiner*—Morton J. Frome
*Attorneys*—Richard R. Brainard, Marvin Snyder, Paul A. Frank, Frank L. Neuhauser, Oscar B. Waddell and Melvin M. Goldenberg

ABSTRACT: A solid-state atomic particle and X-ray detector comprising an N-type semiconductor crystal of high atomic number, coated with a metallic film of low atomic number. By making the metal-to-semiconductor interface abrupt, a Schottky barrier-type junction is produced. Atomic particles or X-rays can easily penetrate the metallic film but are absorbed in the semiconductor near the interface, producing electron-hole pairs in the depletion region. Holes which diffuse beyond the depletion region give rise to a current indicative of detection of X-rays or atomic particles.

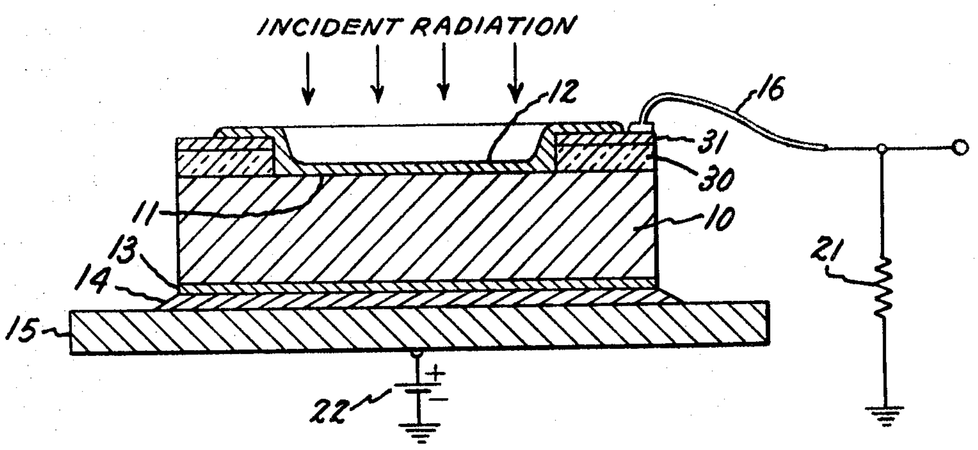
Inventor:
Richard D. Baertsch,
by Marvin Snyder
His Attorney.

SCHOTTKY BARRIER ATOMIC PARTICLE AND X-RAY DETECTOR

This invention relates to atomic particle and X-ray detection devices, and more particularly to a detector wherein X-rays and atomic particles are absorbed in a high atomic number semiconductor after passing through a low atomic number metal film thereon.

In monitoring X-rays and atomic particles such as electrons, protons, and alpha particles, highly sensitive detectors are required where the amount of radiation to be detected is quite low. For this purpose, solid-state detectors are desirable, due to their well known advantages such as ruggedness, small size, and low power consumption. However, highly sensitive solid-state detectors, which are especially useful in detecting low energy electrons, low energy alpha particles, and "soft" X-rays (X-rays of relatively long wavelength) have heretofore suffered from excessive "dark" current output; that is, when receiving substantially no incident radiation, detectors of this type nevertheless produce an output signal, thereby undermining their potential utility in detecting low level radiation.

In R. N. Hall et al., application Ser. No. 742,665 filed concurrently herewith and assigned to the instant assignee, a high selectivity electromagnetic radiation detector comprising a photosensitive semiconductor crystal coated with a metallic film so as to form a surface barrier or Schottky-type semiconductor junction is described and claimed. In the aforementioned Hall et al., application, the metallic film is selected to exhibit high transmissivity to electromagnetic radiation within a predetermined band of wavelengths.

The present invention concerns an X-ray and atomic particle detector for use where radiation levels may drop to very low values, since it does not produce excessive dark current. This is accomplished by choosing the semiconductor and the metal so as to produce a high potential barrier in the device and thereby impede the flow of thermally excited electrons over the barrier. The surface barrier is achieved by coating the semiconductor with a metal of low atomic number so that incident X-rays or atomic particles may easily penetrate the metal and enter the semiconductor. Moreover, to ensure maximum absorption of incident X-rays or atomic particles by the semiconductor, a semiconductor of high atomic number is employed in the device so that the ratio of atomic number of the semiconductor to atomic number of the metal exceeds unity.

Accordingly, one object of the invention is to provide an X-ray and atomic particle detector of high sensitivity and low dark current.

Another object is to provide an X-ray and atomic particle detector having a film of low atomic number metal thereon to produce a Schottky barrier in the detector without substantially stopping incident X-rays and atomic particles impinging thereon.

Another object is to provide a solid-state device for accurately monitoring soft X-rays, low energy electrons, and low energy alpha particles, with high quantum efficiency.

Briefly, in accordance with a preferred embodiment of the invention, an X-ray and atomic particle detection device is described. The device comprises a semiconductive crystal of N-type conductivity and high atomic number. A film of metal of low atomic number and predetermined thickness is coated atop the crystal to form an abrupt metal-to-semiconductor interface with minimal diffusion of the metal into the semiconductor.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which the single FIGURE is a cross-sectional view of the X-ray and atomic particle detecting device of the instant invention.

DESCRIPTION OF TYPICAL EMBODIMENTS

In the FIGURE, a semiconductor crystal 10 is shown having a thin metallic film 12 coated thereon so as to form a distinct, abrupt metal-to-semiconductor interface 11. Semiconductor wafer 10 is preferably of N-type conductivity, and may comprise a semiconductor of sufficiently high atomic numbers such as, for example, gallium arsenide, germanium or cadmium telluride. In a compound semiconductor, the "atomic number" referred to is the atomic number of the element of highest atomic number in the compound. Silicon, while being of a somewhat lower atomic number, may also be utilized, although at a sacrifice of some sensitivity. Metallic film 12 is preferably comprised of a metal having a low atomic number in order to minimize absorption of radiation therein. Thus beryllium, having an atomic number of 4, is a convenient material for metallic film 12 since it is nearly transparent to X-rays and atomic particles by virtue of its low atomic number. Aluminum may also be used for metallic film 12, although this material attenuates the X-rays and atomic particles to a greater extent than beryllium, since the atomic number of aluminum is 13. C. A.

Semiconductor crystal 10 is coated with an annulus 30 of electrically insulating material, such as silicon dioxide, around its incident radiation receiving surface. Insulator 30, in turn, is coated with an annulus 31 of aluminum, for example. Beryllium layer 12 is deposited atop the radiation responsive surface of wafer 10 at a sufficiently low temperature to avoid the possibility that diffusion of beryllium atoms into the semiconductor may occur, consequently precluding any possibility of making ohmic contact between layer 12 and semiconductor 10. When the metallic layer is evaporated or sputtered onto semiconductor wafer 10 in this fashion, a barrier layer, often referred to as a Schottky barrier, is produced in the semiconductor; that is, a steep discontinuity exists in energy levels at the metal-to-semiconductor interface while the Fermi levels of the materials, at zero bias, are identical. The abrupt interface thus formed results in a very thin depletion region in the semiconductor at interface 11. A detailed description of such barrier layers is presented, for example, in *Metal-Semiconductor Surface Barriers*, by C. A. Mead, *Solid-State Electronics*, Vol. 9, pages 1023—1033 (1966).

In order to maintain a high Schottky barrier, large bandgap semiconductors are employed in fabricating the device of the instant invention. If small bandgap semiconductors were to be used in fabricating the device, the height of the Schottky barrier would be small. This would result in low impedance of the diode formed at the metal-to-semiconductor interface, at zero bias, and the signal-to-noise ratio of such device would be unacceptably low. The previously enumerated semiconductors are all of sufficiently large bandgap to avoid such eventuality.

Ohmic contact to wafer 10 on the wafer surface opposite interface 11 is conveniently made through an alloy layer or metallic film 13 and the wafer is soldered through a layer of indium 14 to a header 15 of Kovar, which comprises an alloy of 17—18 percent cobalt, 28—29 percent nickel, and the remainder iron. Contact to beryllium layer 12 may be made through a wire 16 bonded to aluminum annulus 31. Aluminum layer 31 is of sufficient thickness to be opaque to electromagnetic radiation in the optical spectrum, thereby preventing any false indication due to extraneous light impinging upon semiconductor 10 at interface 11.

The detector is typically operated at a reverse bias, so that a positive bias may be supplied to header 15 from a DC source 22. Radiation passing through beryllium film 12 is strongly absorbed in the narrow depletion layer of the Schottky barrier, creating electron-hole pairs therein. This gives rise to an electromotive force which causes a current to flow when a circuit is completed between lead 16 and header 15, as through a load resistance 21. Due to the low atomic number of beryllium, X-ray and atomic particle radiation impinging upon beryllium layer 12 within the annuli passes almost entirely into crystal 10. By employing a semiconductor of high atomic number, the atomic particles or X-rays are absorbed in the smallest possible distance in the semiconductor crystal. Output signals are thereby produced across load resistance 21, and may be furnished to utilization apparatus such as recording means (not shown).

Two countervailing considerations exist in depositing metallic layer 12 on semiconductor 10 of the instant invention. The metal of layer 12 is chosen to be of low atomic number so as to permit maximum transmissivity to incident radiation of the type to be measured and in order to further enhance this transmissivity, layer 12 is made as thin as possible. To form a good Schottky barrier, on the other hand, the electrical resistance of layer 12 must be low and, as thickness of the layer decreases, electrical resistance thereof increases. Accordingly, an optimum thickness of between 100 and 1,000 angstroms is preferably selected for layer 12.

As previously stated, layer 12 is highly transmissive to the incident radiation to be measured, while crystal 10 is highly absorbent thereto. This is because of the atomic numbers of the materials of layer 12 and crystal 10. In fact, when layer 12 comprises beryllium and crystal 10 comprises gallium arsenide, the ratio of atomic number of crystal 10 to atomic number of layer 12 is 8, which is sufficiently high to ensure that almost all of the energy of incident X-rays or atomic particles is absorbed in the crystal. Therefore, the detector of the instant invention makes use of both the minimum dark current provided by the Schottky barrier at the beryllium-to-semiconductor interface, and the large degree of radiation absorption in the semiconductor provided by the high ratio of atomic number of crystal 10 to the low atomic number of layer 12, in its operation.

As one example of how a typical device of the instant invention may be fabricated, an ingot of N-type gallium arsenide having a concentration between $5\times10^{15}$ and $5\times10^{17}$ atoms per cubic centimeter is cut, lapped and polished by conventional techniques into wafers 125 to 500 microns in thickness. Thereafter, a film of silver, typically 5,000 angstroms in thickness, is evaporated onto one side of a wafer. The rate at which the silver is deposited on the wafer may be monitored by measuring the change in resonant frequency of a quartz crystal connected in an oscillator circuit as silver molecules accumulate thereon. Details of this evaporation rate monitoring technique are set forth in J. R. Richardson application Ser. No. 631,775, filed Apr. 18, 1967 and assigned to the instant assignee. Following the evaporation, the wafer is heated at a temperature of about 450° C. in a hydrogen atmosphere for about 30 seconds to allow the silver to form an ohmic contact with the gallium arsenide wafer. The opposite side of the wafer is then lapped and etched in a 1 percent solution of bromine in methanol for about 30 minutes to remove surface damage. An insulator, such as silicon dioxide, is then deposited onto the etched surface of the wafer to a thickness typically about 2,000 angstroms, with the wafer maintained at a temperature of about 250° C. Thereafter, an aluminum layer of about 2,000 angstroms thickness is evaporated atop the insulating layer at a temperature of about 150° C. By use of conventional photoresist techniques, a hole is etched through the aluminum layer with an etchant comprising by volume 25 parts phosphoric acid, 2 parts acetic acid, 1 part nitric acid, and 5 parts water, leaving an annulus 31 of aluminum. This hole is further etched through the silicon dioxide layer with an etchant comprising by volume 10 parts 40 percent ammonium fluoride and 1 part hydrofluoric acid, leaving an annulus 30 of silicon dioxide. Beryllium layer 12 is thereafter evaporated to a thickness of about 1,000 angstroms onto the exposed surface of wafer 10 and the remainder of the aluminum layer while the device is maintained at a temperature of about 150° C. The 1,000 angstrom thickness of beryllium layer 12 represents an optimum value, permitting the beryllium layer to have sufficient electrical conductivity to produce a Schottky barrier in the device, while not being so thick as to prevent a high degree of transmissivity to incident radiation to be measured. The wafer is then mounted on Kovar header 15 through indium solder 14, and an electrical connection is made to beryllium layer 12 by bonding an aluminum wire to the surface.

The quantum efficiency of the device thus fabricated is quite high, since each atomic particle absorbed in crystal 10 produces a large number of electron-hole pairs. This is because one electron-hole pair is produced for about each 4.5 electron volts of energy absorbed by gallium arsenide crystal 10.

The foregoing describes an X-ray and atomic particle detector of high sensitivity and low dark current. The detector has a film of a low atomic number metal thereon to produce a Schottky barrier in the detector without substantially stopping incident X-rays and atomic particles impinging thereon. The detector is a solid state device of high quantum efficiency which accurately monitors soft X-rays, low energy electrons and low energy alpha particles.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A radiation-detecting device for detecting X-ray and atomic particle radiation comprising: a semiconductor crystal of N-type conductivity; and a metallic film of beryllium coated atop one surface of said crystal to form a Schottky barrier layer in said crystal, the ratio of atomic number of the material of said semiconductor to atomic number of the metal of said film being above unity to ensure absorption by said semiconductor crystal of a high proportion of radiation incident upon said device.

2. The radiation detection device of claim 1 wherein said semiconductor comprises one of the group consisting of gallium arsenide, silicon, germanium, and cadmium telluride.

3. The radiation detection device of claim 1 wherein said semiconductor comprises gallium arsenide.